(12) United States Patent
Neichev et al.

(10) Patent No.: US 11,089,093 B2
(45) Date of Patent: Aug. 10, 2021

(54) VALIDATION OF A TRAFFIC MANAGEMENT POOL

(71) Applicant: SAP SE, Walldorf (DE)

(72) Inventors: Nikolai Neichev, Sofia (BG); Georgi Enchev, Gorna Oryachovitsa (BG)

(73) Assignee: SAP SE, Walldorf (DE)

( * ) Notice: Subject to any disclaimer, the term of this patent is extended or adjusted under 35 U.S.C. 154(b) by 68 days.

(21) Appl. No.: 16/119,639

(22) Filed: Aug. 31, 2018

(65) Prior Publication Data
US 2020/0076887 A1   Mar. 5, 2020

(51) Int. Cl.
*H04L 29/08* (2006.01)
*H04L 12/24* (2006.01)

(52) U.S. Cl.
CPC ...... *H04L 67/1034* (2013.01); *H04L 41/0668* (2013.01); *H04L 41/084* (2013.01); *H04L 41/0873* (2013.01)

(58) Field of Classification Search
CPC ............. H04L 67/1034; H04L 41/0668; H04L 41/084; H04L 41/0873; H04L 41/0846
See application file for complete search history.

(56) References Cited

U.S. PATENT DOCUMENTS

| 2011/0265168 A1* | 10/2011 | Lucovsky | H04L 63/0245 726/7 |
| 2015/0006732 A1* | 1/2015 | Schmidt | H04L 47/726 709/226 |
| 2016/0352588 A1* | 12/2016 | Subbarayan | H04L 41/0813 |

\* cited by examiner

*Primary Examiner* — Abdulkader M Alriyashi
(74) *Attorney, Agent, or Firm* — Mintz Levin Cohn Ferris Glovsky and Popeo, P.C.

(57) ABSTRACT

A method for validating a traffic management pool that includes a first traffic management device and a second traffic management device may include forming the traffic management pool. The traffic management pool may be formed by modifying a configuration of the first traffic management device to route requests for a cloud-based application based at least on an availability of a first instance of the cloud-based application at a first cloud platform landscape. Synchronicity within the traffic management pool may be validated based on the modification to the configuration of the first traffic management device being propagated to the second traffic management device such that the second traffic management device is also configured to route the requests for the cloud-based application based on the availability of the first instance of the cloud-based application. Related systems and articles of manufacture are also provided.

17 Claims, 5 Drawing Sheets

VALIDATION OF A TRAFFIC MANAGEMENT POOL

FIELD

The present disclosure generally relates to cloud computing and, more specifically, to the validation of a traffic management pool.

BACKGROUND

Many businesses may rely on applications hosted on a cloud platform such as, for example, SAP HANA Cloud Platform, as provided by SAP SE, Walldorf, Germany. The cloud platform may be configured to provide remote resources (e.g., servers, databases, and/or the like) for storing, managing, and/or processing data. However, the cloud platform may be susceptible to failures triggered, for example, by natural and/or manmade disasters. Failures at the cloud platform may lead to costly data loss and/or service interruptions.

SUMMARY

Methods, systems, and articles of manufacture, including computer program products, are provided for validating a traffic management pool. In one aspect, there is provided a system including at least one processor and at least one memory. The at least one memory can store instructions that cause operations when executed by the at least one processor. The operations can include: forming a traffic management pool that includes a first traffic management device and a second traffic management device, the traffic management pool being formed at least in part by modifying a configuration of the first traffic management device to route requests for a cloud-based application based on an availability of a first instance of the cloud-based application at a first cloud platform landscape; and validating synchronicity within the traffic management pool based at least in part on the modification to the configuration of the first traffic management device being propagated to the second traffic management device, such that the second traffic management device is also configured to route the requests for the cloud-based application based on the availability of the first instance of the cloud-based application.

In some variations, one or more of the features disclosed herein including the following features can optionally be included in any feasible combination. The traffic management pool may be deleted by at least modifying the configuration of the first traffic management device to cease routing the requests for the cloud-based application based at least on the availability of the first instance of the cloud-based application. Synchronicity within the traffic management pool may be further validated based on the modification to the configuration of the first traffic management device being propagated to the second traffic management device such that the second traffic management device is also configured to cease routing the requests for the cloud-based application based at least on the availability of the first instance of the cloud-based application.

In some variations, the first traffic management device and/or the second traffic management device may be configured to route, to the first instance of the cloud-based application at the first cloud platform landscape, the requests for the cloud-based application based at least on the first instance of the cloud-based application being available. The configuration of the first traffic management device may be modified by at least modifying a record at the first traffic management device to map a custom domain of the cloud-based application to a uniform resource locator (URL) of the first instance of the cloud-based application.

In some variations, the first traffic management device and/or the second traffic management device may be configured to route, to a second instance of the cloud-based application at a second cloud platform landscape, the requests for the cloud-based application based at least on the first instance of the cloud-based application being unavailable. The configuration of the first traffic management device may be further modified by at least modifying the record at the first traffic management device to map the custom domain of the cloud-based application to a URL of the second instance of the cloud-based application instead of the URL of the first instance of the cloud-based application. The second instance of the cloud-based application may be a copy of the first instance of the cloud-based application.

In some variations, the first traffic management device may be a default traffic management device. The second traffic management device may be a backup traffic management device.

In some variations, synchronicity within the traffic management pool may be further validated based at least on the modification to the configuration of the first traffic management device being propagated to the second traffic management device within a threshold quantity of time.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the validation of a traffic management pool, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Like labels are used to refer to same or similar items in the drawings.

DETAILED DESCRIPTION

Disaster recovery measures may be implemented to minimize data loss and downtime in the event that a primary cloud platform landscape hosting a primary instance of a cloud-based application fails, for example, due to a natural and/or manmade disaster. For example, a traffic management pool may direct, based on an availability of the primary instance of the cloud-based application, requests for the cloud-based application to the first instance of the cloud-based application or a second instance of the cloud-based application hosted at a secondary cloud platform landscape. The secondary instance of the cloud-based application may be a copy of the primary instance of the cloud-based application. For instance, the secondary instance of the cloud-based application may be a replica of the primary instance of the cloud-based application having the same configurations and/or data as the primary instance of the cloud-based application. In the event of a failure at the primary cloud platform that renders the primary instance of the cloud-based application unavailable, the traffic management pool may direct requests for the cloud-based application to the secondary instance of the cloud-based application instead of the primary instance of the cloud-based application.

In some implementations of the current subject matter, enabling disaster recovery measures for the cloud-based application may include configuring a domain name system (DNS) service to map a custom domain of the cloud-based application to a uniform resource locator (URL) of the traffic management pool. For example, the DNS service may maintain a canonical name (CNAME) record that maps the custom domain of the cloud-based application to the URL of the traffic management pool such that requests for the cloud-based application are directed to the traffic management pool. Meanwhile, the traffic management pool may be configured to direct, based on the availability of the primary instance of the cloud-based application, requests for the cloud-based application to the primary instance of the cloud-based application hosted at the primary cloud platform landscape or the secondary instance of the cloud-based application hosted at the secondary cloud platform landscape. For instance, while the primary instance of the cloud-based application is available, the traffic management pool may direct requests for the application to the primary instance of the cloud-based application. Alternatively and/or additionally, in the event that the primary instance of the cloud-based application is unavailable, for example, due to a failure at the primary cloud platform landscape, the traffic management pool may perform a traffic switch from the primary instance of the cloud-based application to the secondary instance of the cloud-based application. As such, the traffic management pool may direct subsequent requests for the cloud-based application to the secondary instance of the cloud-based application at the secondary cloud platform landscape instead of the primary instance of the cloud-based application at the primary cloud platform landscape.

In some implementations of the current subject matter, the traffic management pool may include multiple traffic management devices, each of which being a processor-based device configured to provide one or more application delivery functionalities including, for example, load balancing, traffic routing, and/or the like. Some traffic management devices in the traffic management pool may serve as default traffic management devices while other traffic management devices in the traffic management pool may serve as backup traffic management devices. Furthermore, each traffic management device in the traffic management pool may be configured to direct, based on the availability of the primary instance of the cloud-based application, requests for the cloud-based application to the primary instance of the cloud-based application hosted at the primary cloud platform landscape or the secondary instance of the cloud-based application hosted at the secondary cloud platform landscape. As such, the traffic management devices in the traffic management pool may be synchronized such that the same configurations may be propagated to every traffic management device in the traffic management pool.

In some implementations of the current subject matter, validation may be performed in order to ensure synchronicity amongst the traffic management devices within the traffic management pool. As noted, traffic management devices within the traffic management pool may be synchronized such that the same configurations are propagated to every traffic management device within the traffic management pool. Accordingly, validating synchronicity amongst the traffic management devices in the traffic management pool may include determining whether a modification to the configuration of one traffic management device in the traffic management pool is propagated to the other traffic management devices within the traffic management pool. For example, in order for a traffic management device to perform a traffic switch that includes directing requests for the cloud-based application to the secondary instance of the cloud-based application at the secondary cloud platform landscape instead of the primary instance of the cloud-based application at the primary cloud platform landscape, a record at the traffic management device may be updated to map the custom domain of the cloud-based application to a URL associated with the secondary cloud-based application instead of a URL associated with the primary cloud-based application. Synchronicity amongst the traffic management devices within the traffic management pool may be validated by at least determining whether the records at the other traffic management devices are also be updated to map the custom domain of the cloud-based application to a URL associated with the secondary cloud-based application instead of a URL associated with the primary cloud-based application.

Figure 1:
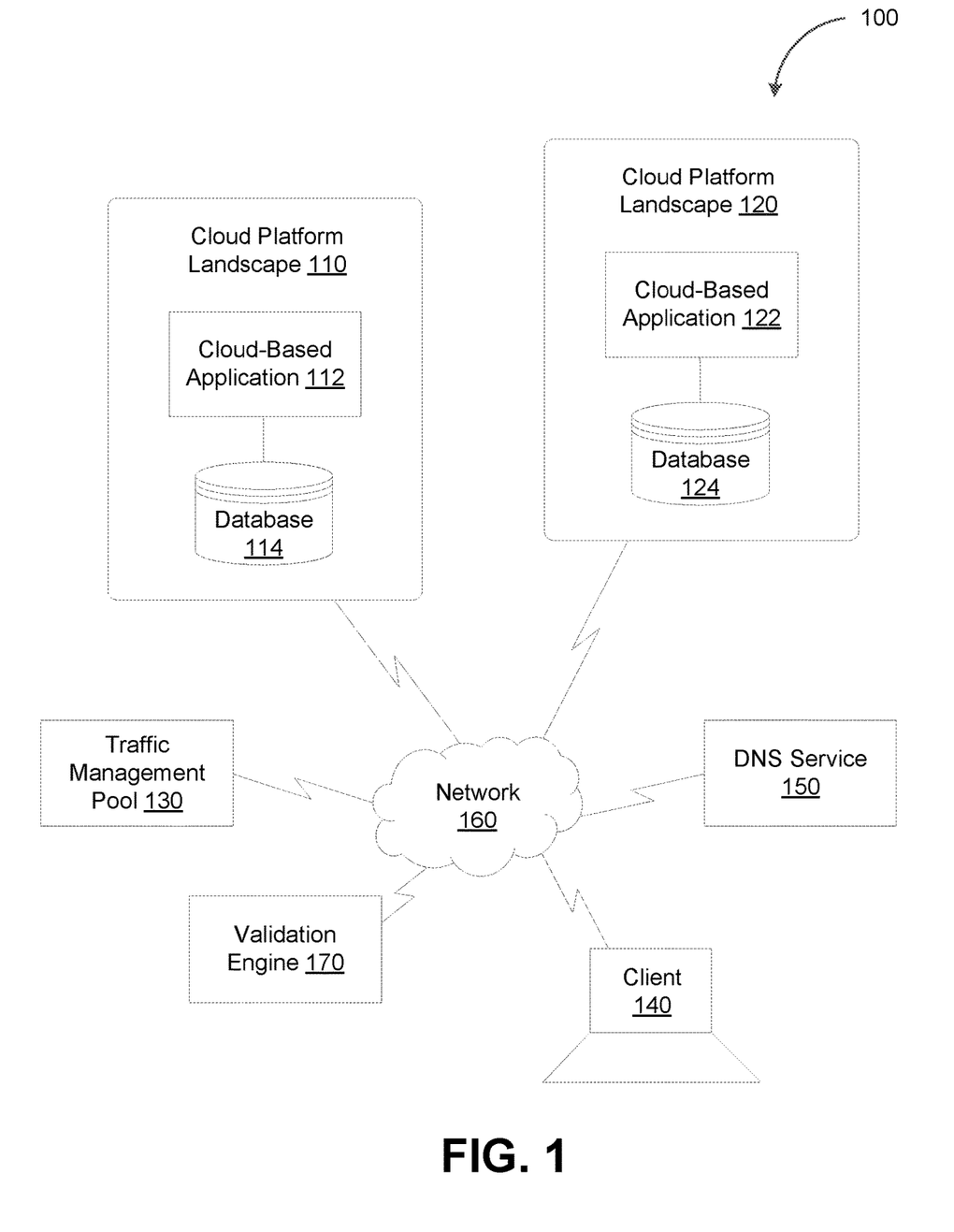
FIG. 1 depicts a system diagram illustrating a traffic management system consistent with implementations of the current subject matter.

FIG. 1 depicts a system diagram illustrating a traffic management system 100 consistent with implementations of the current subject matter. Referring to FIG. 1, the traffic management system 100 may include a first cloud platform landscape 110, a second cloud platform landscape 120, a traffic management pool 130, a client 140, a DNS service 150, and a validation engine 170. As shown in FIG. 1, the first cloud platform landscape 110, the second cloud platform landscape 120, the traffic management pool 130, the client 140, the DNS service 150, and/or the validation engine 170 may be communicatively coupled via a network 160. It should be appreciated that the network 160 may be any wired and/or wireless network including, for example, a wide area network (WAN), local area network (LAN), a virtual local area network (VLAN), the Internet, and/or the like. Meanwhile, the traffic management pool 130 may include one or more traffic management devices configured to provide application delivery functionalities including, for example, load balancing, traffic routing, and/or the like.

As shown in FIG. 1, a first instance of the cloud-based application 112 may be deployed at the first cloud platform landscape 110. In addition, data associated with the first instance of the cloud-based application 112 may be stored in a first database 114 at the first cloud platform landscape 110. The data associated with the first instance of the cloud-based application 112 may include, for example, configurations, subscriptions, tenants, destinations (e.g., connectivity configurations to other applications), roles, permissions, assignments, members, and/or the like.

Referring again to FIG. 1, disaster recovery measures for the cloud-based application may include deploying a copy of the cloud-based application at another cloud platform landscape. For example, a second instance of the cloud-based application 122 may be deployed at the second cloud platform landscape 120. Configurations applied at the first instance of the cloud-based application 112 may also be applied to the second instance of the cloud-based application 124 including, for example, a custom domain for the cloud-based application, permissions (e.g., administrators, developers, and/or the like), subscriptions (e.g., to other applications, accounts, and/or the like), destinations (e.g., connectivity to other applications), and/or the like. Furthermore, data from the first database 114 may be replicated at a second database 124 in the second cloud platform landscape 120. By replicating data and/or configurations from the first instance of the cloud-based application 112 to the second instance of the cloud-based application 122, the second instance of the cloud-based application 122 may be a copy of the first instance of the cloud-based application 112.

A browser at the client 140 may resolve one or more hypertext transfer protocol (HTTP) requests for the custom domain of the cloud-based application by at least requesting the DNS service 150 to provide a mapping for the custom domain of the cloud-based application. When disaster recovery measures are enabled for the cloud-based application, the DNS service 170 may be configured to provide a mapping between the custom domain of the cloud-based application to a URL of the traffic management pool 130. For example, the DNS service 170 may maintain a CNAME record mapping the custom domain of the cloud-based application to the URL of the traffic management pool 130. As such, when disaster recovery measures are enabled for the cloud-based application, requests for the cloud-based application may be directed to the traffic management pool 130 instead of directly to the first instance of the cloud-based application 112 or the second instance of the cloud-based application 122.

In some implementations of the current subject matter, the traffic management pool 130 may be configured to direct, based on the availability of the first instance of the cloud-based application 112, requests for the cloud-based application to the first instance of the cloud-based application 112 or the second instance of the cloud-based application 122. For instance, while the first instance of the cloud-based application is 112 is available, the traffic management pool 130 may direct requests for the cloud-based application to the first instance of the cloud-based application 112 at the first cloud platform landscape 110. Alternately and/or additionally, in the event the first instance of the cloud-based application 112 is unavailable (e.g., due to a failure at the first cloud platform landscape 110), the traffic management pool 130 may direct requests for the cloud-based application to the second instance of the cloud-based application 122 at the second cloud platform landscape 120 instead of the first instance of the cloud-based application 112 at the first cloud platform landscape 110.

In some implementations of the current subject matter, the traffic management pool 130 may maintain, for example, at each traffic management device within the traffic management pool 130, one or more records mapping the custom domain of the cloud-based application to a first URL associated with the first instance of the cloud-based application 112 or a second URL associated with the second instance of the cloud-based application 122. These records may be modified based on the availability of the first instance of the cloud-based application 112. For example, while the first instance of the cloud-based application is 112 is available, the records may map the custom domain of the cloud-based application to the first URL associated with the first instance of the cloud-based application 112 such that the traffic management pool 130 may direct requests for the cloud-based application to the first instance of the cloud-based application 112 at the first cloud platform landscape 110.

In the event the first instance of the cloud-based application 112 is unavailable (e.g., due to a failure at the first cloud platform landscape 110), the records may be modified to map the custom domain of the cloud-based application to the second URL associated with the second instance of the cloud-based application 122. Modifying the records in this manner may cause the traffic management pool 130 to perform a traffic switch from the first instance of the cloud-based application 112 to the second instance of the cloud-based application 122. By performing the traffic switch, future requests for the cloud-based application may be directed to the second instance of the cloud-based application 122 instead of the first instance of the cloud-based application 112.

Alternatively and/or additionally, the traffic management pool 130 may be configured to perform another traffic switch when the availability of the first instance of the cloud-based application 112 is restored. For example, the records at the traffic management pool 130 may be modified to map the custom domain of the cloud-based application to the first URL associated with the first instance of the cloud-based application. In doing so, the traffic management pool 130 may cease direct requests for the cloud-based application to the second instance of the cloud-based application 122. Instead, the traffic management pool 130 may direct requests for the cloud-based application to the first instance of the cloud-based application 112.

In some implementations of the current subject matter, the validation engine 170 may be configured to validate synchronicity amongst the traffic management devices within the traffic management pool 130. To validate synchronicity amongst the traffic management devices in the traffic management pool 130, the validation engine 170 may determine whether a modification to the configuration of one traffic management device in the traffic management pool 130 is propagated to the other traffic management devices within the traffic management pool 130. For example, a record at one traffic management device within the traffic management pool 130 may be modified to map the custom domain of the cloud-based application to the second URL of the second instance of the cloud-based application 122 when the first instance of the cloud-based application 112 is unavailable. The validation engine 170 may determine that the traffic management devices in the traffic management pool 130 are synchronized if record at the other traffic management devices in the traffic management pool 130 are also modified to map the custom domain of the cloud-based application to the second URL of the second instance of the cloud-based application 122.

It should be appreciated that a traffic management pool may refer to a group of synchronized traffic management devices having identical configurations for directing requests for the cloud-based application, for example, based on the availability of the first instance of the cloud-based application 112. Modifications to the configuration of one traffic management device in the traffic management pool may be propagated to other traffic management devices in the traffic management pool, thereby maintaining synchronicity amongst the traffic management devices within the traffic management pool. For instance, two or more traffic management devices may form the traffic management pool 130 by at least having identical configurations for directing, based on the availability of the first instance of the cloud-based application 112, requests for the cloud-based application to the first instance of the cloud-based application 112 or the second instance of the cloud-based application 122. Modifications to any one traffic management device within this traffic management pool 130 may be propagated to every other traffic management device within the traffic management pool 130.

Figure 2:
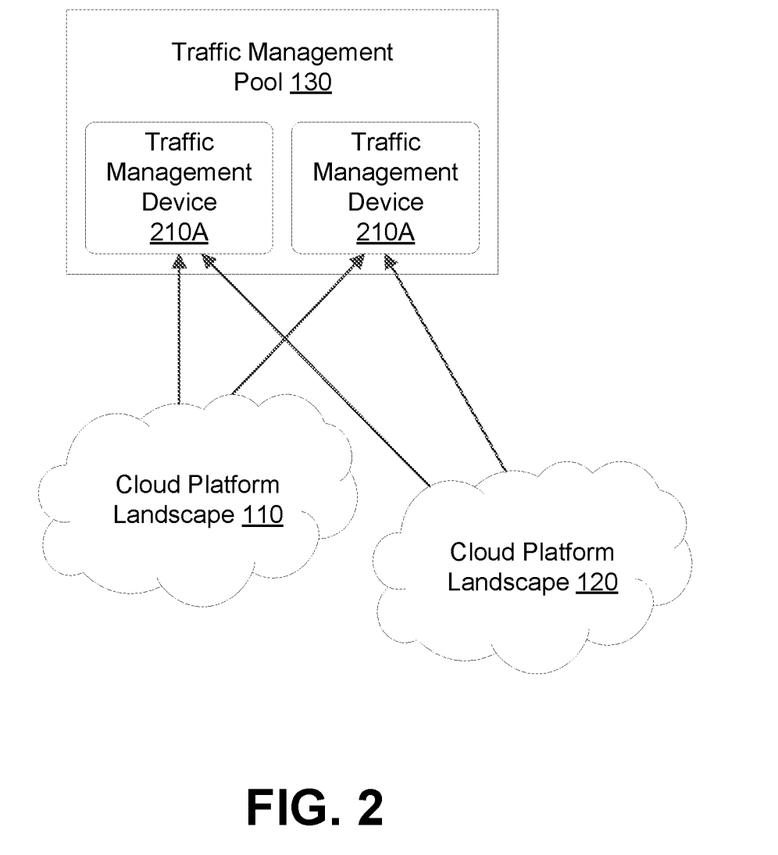
FIG. 2 depicts a block diagram illustrating a traffic management pool consistent with implementations of the current subject matter.

To further illustrate, FIG. 2 depicts a block diagram illustrating the traffic management pool 130 consistent with implementations of the current subject matter. Referring to FIG. 2, the traffic management pool 130 may include a plurality of traffic management devices including, for example, a first traffic management device 210A, a second traffic management device 210B, and/or the like. However, it should be appreciated that the traffic management pool 130 may include a different quantity of traffic management devices than shown in FIG. 2.

In some implementations of the current subject matter, the first traffic management device 210A and/or the second traffic management device 210B may each be a processor-based device configured to provide one or more application delivery functionalities including, for example, load balancing, traffic routing, and/or the like. Furthermore, the first traffic management device 210A may be a default traffic management device while the second traffic management device 210B may be a backup traffic management device. As such, the second traffic management device 210B may direct requests for the cloud-based application when the first traffic management device 210A is unavailable.

In some implementations of the current subject matter, the validation engine 170 may validate synchronicity amongst the first traffic management device 210A and the second traffic management device 210B. For example, the first traffic management device 210A and the second traffic management device 210B may form a traffic management pool configured to direct requests for the cloud-based application. As such, the first traffic management device 210A and the second traffic management device 210B may each maintain a record mapping the custom domain of the cloud-based application to the first instance of the cloud-based application 112 at the first cloud platform landscape 110 or the second instance of the cloud-based application 122 at the second cloud platform landscape 120. The first traffic management device 210A and the second traffic management device 210B may be synchronized if modifications to the record maintained at the first traffic management device 210A are propagated to the second traffic management device 210B. Alternatively and/or additionally, the first traffic management device 210A and the second traffic management device 210B may be synchronized if modifications to the record maintained at the second traffic management device 210B are also propagated to the record maintained at the first traffic management device 210A.

For instance, the traffic management pool 130 may perform a traffic switch from the first instance of the cloud-based application 112 to the second instance of the cloud-based application 122 when the first instance of the cloud-based application 112 is unavailable, for example, due to a failure at the first cloud platform landscape 110. The traffic switch may be performed by at least modifying the record maintained at the first traffic management device 210A and the record maintained at the second traffic management device 210B to map the custom domain of the cloud-based application to the first URL associated with the first instance of the cloud-based application 112 instead of the second URL associated with the second instance of the cloud-based application 122.

According to some implementations of the current subject matter, the validation engine 170 may determine that the first traffic management device 210A and the second traffic management device 210B are synchronized if modifications to the record maintained at the first traffic management device 210A are propagated to the record maintained at the second traffic management device 210B. Alternatively and/or additionally, the validation engine 170 may determine that the first traffic management device 210A and the second traffic management device 210B are synchronized if modifications to the record maintained at the second traffic management device 210B are also propagated to the record maintained at the first traffic management device 210A. It should be appreciated that the records maintained at the first traffic management device 210A and the second traffic management device 210B may be modified as part of disaster recovery measures for the cloud-based application. The records may be modified such that the traffic management pool 130 may direct request for the cloud-based application to the second instance of the cloud-based application 122 at the second cloud platform landscape 120 when the first instance of the cloud-based application 112 is unavailable, for example, due to a failure at the first cloud platform landscape 110.

Figure 3:
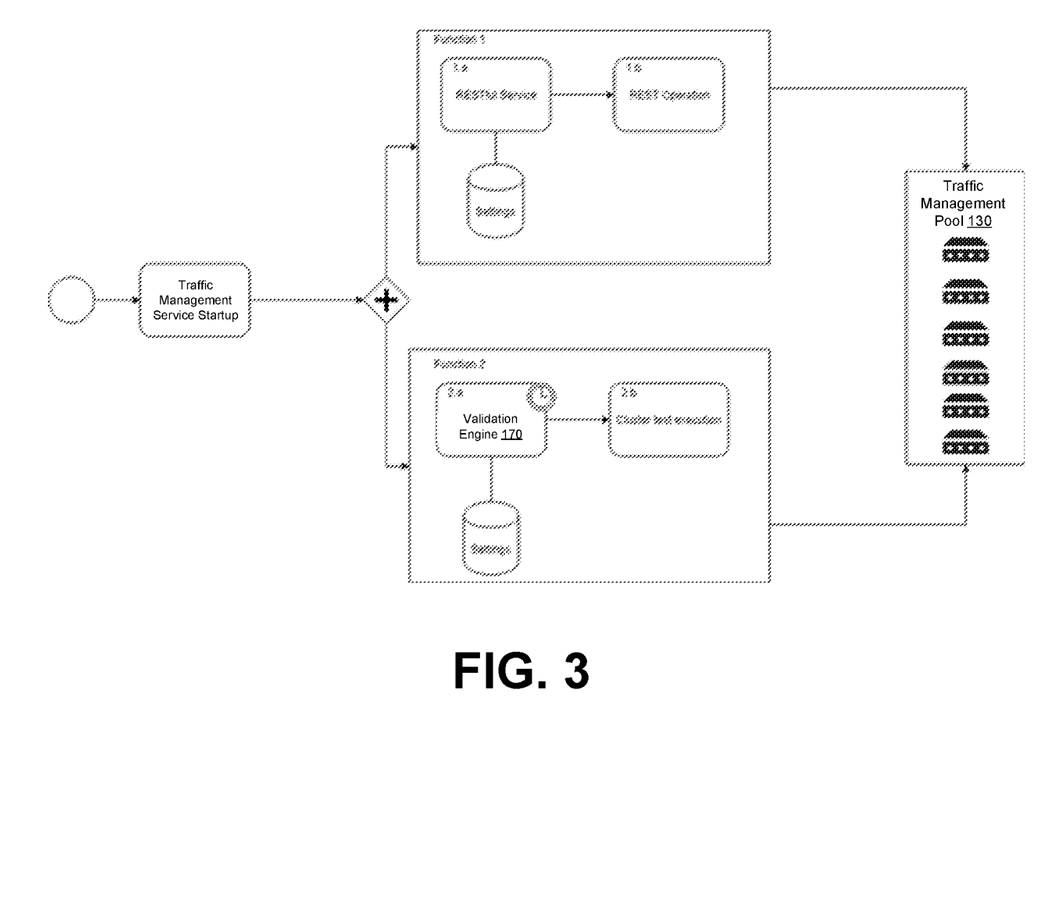
FIG. 3 depicts a block diagram illustrating an internal flow of a traffic management application consistent with implementations of the current subject matter.

FIG. 3 depicts a block diagram illustrating an internal flow of a traffic management application consistent with implementations of the current subject matter. In some implementations of the current subject matter, the traffic management pool 130 may support one or more functionalities including, for example, a traffic routing functionality, a synchronicity testing functionality, and/or the like.

In some implementations of the current subject matter, the one or more functionalities of the traffic management pool 130 may be exposed via an application programing interface (API). For example, as shown in FIG. 3, the traffic routing functionality of the traffic management pool 130 may be available as a representational state transfer (RESTful) service. As such, a request from the client 140 for the cloud-based application may be routed, for example, by the DNS service 150, to the traffic management pool 130 as a REST operation (e.g., a GET operation) for retrieving, from the traffic management pool 130, a mapping for the custom domain of the cloud-based application. As noted, the traffic management pool 130 may maintain one or more records mapping the custom domain of the cloud-based application to the first URL of the first instance of the cloud-based application 112 at the first cloud platform landscape 110 or the second URL of the second instance of the cloud-based application 122 at the second cloud platform landscape 120 depending on the availability of the first instance of the cloud-based application 112. Accordingly, the traffic management pool 130 may respond to the REST operation by at least providing, to the client 140, the first URL of the first instance of the cloud-based application 112 or the second URL of the second instance of the cloud-based application 122 mapped to the custom domain of the cloud-based application.

Alternatively and/or additionally, the traffic management pool 130 may also support a synchronicity testing functionality. As noted, the validation engine 170 may be configured to validate synchronicity amongst the traffic management devices within the traffic management pool 130 including, for example, the first traffic management device 210A and the second traffic management device 210B. The validation engine 170 may determine that the traffic management pool 130 is synchronized if modifications to the configurations at the first traffic management device 210A are propagated to the second traffic management device 210B and/or if modifications to the configurations at the second traffic management device 210B are propagated to the first traffic management device 210A. According to some implementations of the current subject matter, synchronicity testing may be timed such that the validation engine 170 may determine that the traffic management pool 130 is synchronized if modifications are propagated across the first traffic management device 210A and the second traffic management device 210B within a threshold quantity of time.

Figure 4:
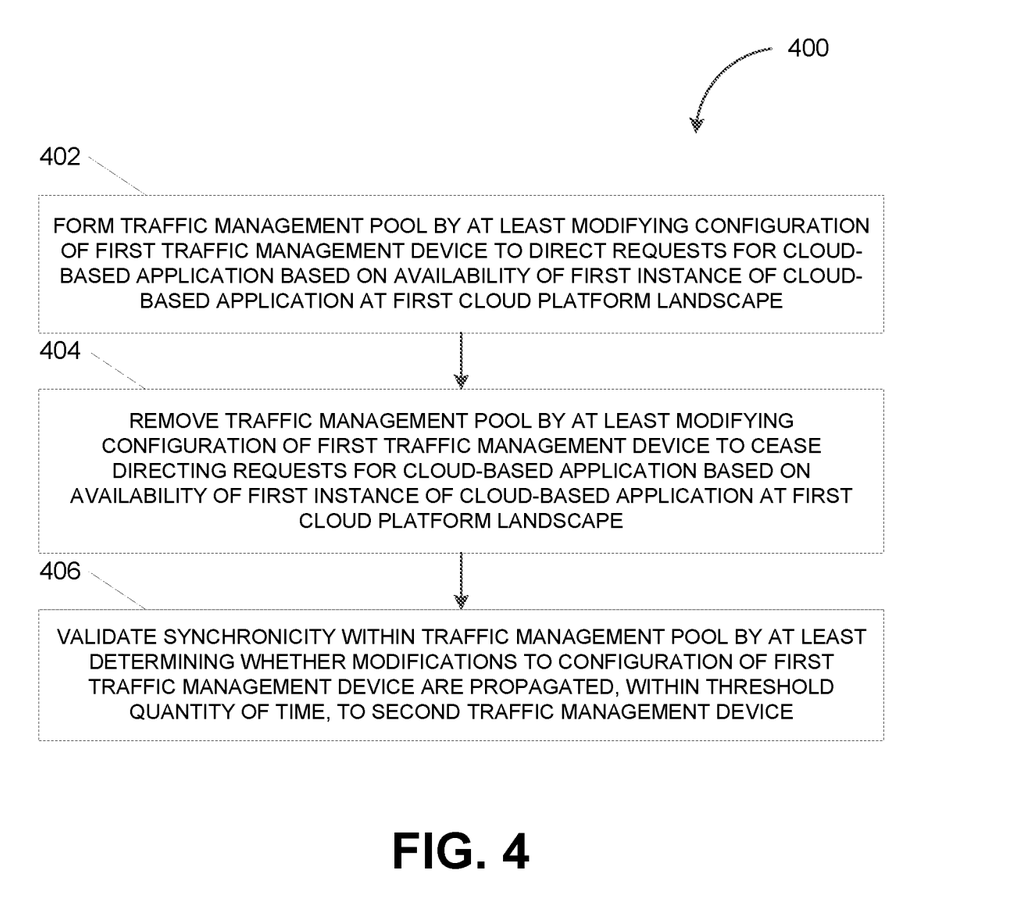
FIG. 4 depicts a flowchart illustrating a process for validating a traffic management pool consistent with implementations of the current subject matter.

FIG. 4 depicts a flowchart illustrating a process 400 for validating a traffic management pool consistent with implementations of the current subject matter. Referring to FIGS. 1-4, the process 400 may be performed by the validation engine 170, for example, to validate synchronicity amongst the traffic management devices within the traffic management pool 130 including, for example, the first traffic management device 210A and the second traffic management device 210B.

The validation engine 170 may form the traffic management pool 130 at least by modifying a configuration of the first traffic management device 210A to direct requests for the cloud-based application based on an availability of the first instance of the cloud-based application 112 at the first cloud platform landscape 110 (402). In some implementations of the current subject matter, the validation engine 170 may form the traffic management pool 130 by at least modifying the configuration of one traffic management device within the traffic management pool 130. It should be appreciated that the validation engine 170 may modify the configuration of any traffic management device within the traffic management pool 130 including, for example, a traffic management device that is selected at random. When the traffic management devices within the traffic management pool 130 are synchronized, the modifications to the configuration of one traffic management device within the traffic management pool 130 may propagate to the other traffic management devices within the traffic management pool 130.

For example, in some implementations of the current subject matter, the traffic management pool 130 may include two or more traffic management devices including, for example, the first traffic management device 210A and the second traffic device 210B, having identical configurations for directing requests for the cloud-based application based on the availability of the first instance of the cloud-based application 112. For example, forming the traffic management pool 130 may include modifying a record at the first traffic management device 210A to map the custom domain of the cloud-based application to the first URL of the first instance of the cloud-based application 112 or the second URL of the second instance of the cloud-based application 122, depending on the availability of the first instance of the cloud-based application 112. As noted, the record at the first traffic management device 210A may map the custom domain of the cloud-based application to the first URL of the first instance of the cloud-based application 112 when the first instance of the cloud-based application 112 is available. Alternatively and/or additionally, the record at the first traffic management device 210A may map the custom domain of the cloud-based application to the second URL of the second instance of the cloud-based application 122 when the first instance of the cloud-based application 112 is unavailable, for example, due to a failure at the first cloud platform landscape 110.

The validation engine 170 may remove the traffic management pool 130 by at least modifying the configuration at the first traffic management device 210A to cease the directing of requests for the cloud-based application based on an availability of the first instance of the cloud-based application 112 at the first cloud platform landscape 110 (404). In some implementations of the current subject matter, the validation engine 170 may remove the traffic management pool 130 by at least modifying the configuration of one traffic management device within the traffic management pool 130. As noted, the validation engine 170 may modify the configuration of any traffic management device within the traffic management pool 130 including, for example, a traffic management device that is selected at random. Furthermore, when the traffic management devices within the traffic management pool 130 are synchronized, the modifications to the configuration of one traffic management device within the traffic management pool 130 may propagate to the other traffic management devices within the traffic management pool 130.

For example, the traffic management pool 130 may be deleted by at least modifying the configuration of the first traffic management device 210A within the traffic management pool 130. The configuration of the first traffic management device 210A may be modified to cease direct requests for the cloud-based application based on the availability of the first instance of the cloud-based application 112. The traffic management pool 130 may be removed when the same modifications are propagated to the second traffic management device 210B included in the traffic management pool 130 such that the second traffic management device 210B also ceases to direct requests for the cloud-based application based on the availability of the first instance of the cloud-based application 112.

The validation engine 170 may validate synchronicity within the traffic management pool 130 by at least determining whether the modifications to the configuration of the first traffic management device 210A are propagated, within a threshold quantity of time, to the second traffic management device 210B (406). In some implementations of the current subject matter, the validation engine 170 may determine that the traffic management pool 130 is synchronized if modifications to the configuration of the first traffic management device 210A are propagated to the second traffic management device 210B within a threshold quantity of time. For example, the validation engine 170 may determine that the traffic management pool 130 is synchronized if the modification to direct requests to the cloud-based application based on the availability of the first instance of the cloud-based application 112 is propagated from the first traffic management device 210A to the second traffic management device 210B within the threshold quantity of time. Alternatively and/or additionally, the validation engine 170 may determine that the traffic management pool 130 is synchronized if the modification to cease directing requests for the cloud-based application based on the availability of the first instance of the cloud-based application 112 is propagated from the first traffic management device 210A to the second traffic management device 210B within the threshold quantity of time.

Figure 5:
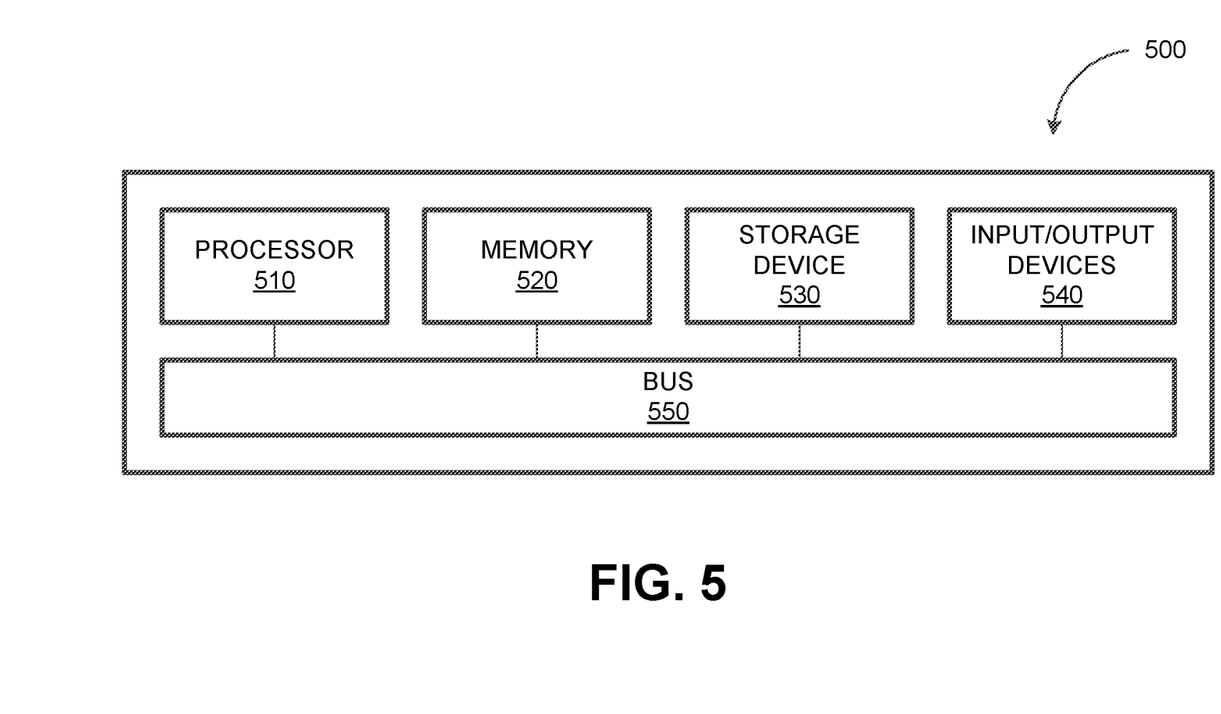
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 1 and 5, the computing system 500 can be used to implement the validation engine 170 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the validation engine 170. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
    at least one data processor; and
    at least one memory storing instructions, which when executed by the at least one data processor, result in operations comprising:
        in response to a disaster recovery mode being enabled for a cloud-based application, routing, by a traffic management pool and based on an availability of a first instance of the cloud-based application at a first cloud platform landscape, requests for the cloud-based application to the first instance of the cloud-based application at the first cloud platform landscape and routing, by the traffic management pool and based on the first instance of the cloud-based application being unavailable at the first cloud platform landscape, the requests for the cloud-based application to a second instance of the cloud-based application at a second cloud platform;
    forming the traffic management pool that includes a first traffic management device and a second traffic management device, the traffic management pool being formed at least in part by modifying a configuration of the first traffic management device to route the requests for the cloud-based application based on the availability of the first instance of the cloud-based application at the first cloud platform landscape, the modifying includes updating, in response to the first instance of the cloud-based application being unavailable and disaster recovery mode being enabled for the cloud-based application, a first record at the first traffic management device to map a custom domain of the cloud-based application to a first uniform resource locator of the second instance of the cloud-based application at the second cloud platform landscape;
    validating, within a threshold quantity of time, a synchronicity within the traffic management pool based at least in part on the modification to the configuration of the first traffic management device being propagated to the second traffic management device, such that the second traffic management device is also configured to route the requests for the cloud-based application based on the availability of the first instance of the cloud-based application, the synchronicity within the traffic management pool being validated based at least on a second record at the second traffic management device also being updated, in response to the first instance of the cloud-based application being unavailable and disaster recovery mode being enabled for the cloud-based application, to map the custom domain of the cloud-based application to the first uniform resource locator of the second instance of the cloud-based application at the second cloud platform landscape; and
    in response to the disaster recovery mode not being enabled for the cloud-based application, the requests for the cloud-based application by-pass the traffic management pool and are routed directly from a client device to the cloud-based application.

2. The system of claim 1, further comprising:
    deleting the traffic management pool by at least modifying the configuration of the first traffic management device to cease routing the requests for the cloud-based application based at least on the unavailability of the first instance of the cloud-based application; and
    validating the synchronicity within the traffic management pool further based on the modification to the configuration of the first traffic management device being propagated to the second traffic management device such that the second traffic management device is also configured to cease routing the requests for the cloud-based application based at least on the unavailability of the first instance of the cloud-based application.

3. The system of claim 1, wherein the first traffic management device and/or the second traffic management device are configured to route, to the first instance of the cloud-based application at the first cloud platform landscape, the requests for the cloud-based application based at least on the first instance of the cloud-based application being available.

4. The system of claim 1, wherein the modifying further includes updating, in response to the first instance of the cloud-based application being available, the first record at the first traffic management device and the second record at the second traffic management device to map the custom domain of the cloud-based application to a second uniform resource locator (URL) of the first instance of the cloud-based application.

5. The system of claim 1, wherein the first traffic management device and/or the second traffic management device are configured to route, to the second instance of the cloud-based application at the second cloud platform landscape, the requests for the cloud-based application based at least on the first instance of the cloud-based application being unavailable.

6. The system of claim 1, wherein the second instance of the cloud-based application comprises a copy of the first instance of the cloud-based application.

7. The system of claim 1, wherein the first traffic management device comprises a default traffic management device, and wherein the second traffic management device comprises a backup traffic management device.

8. A computer-implemented method, comprising:
in response to a disaster recovery mode being enabled for a cloud-based application, routing, by a traffic management pool and based on an availability of a first instance of the cloud-based application at a first cloud platform landscape, requests for the cloud-based application to the first instance of the cloud-based application at the first cloud platform landscape and routing, by the traffic management pool and based on the first instance of the cloud-based application being unavailable at the first cloud platform landscape, the requests for the cloud-based application to a second instance of the cloud-based application at a second cloud platform;
forming the traffic management pool that includes a first traffic management device and a second traffic management device, the traffic management pool being formed at least in part by modifying a configuration of the first traffic management device to route the requests for the cloud-based application based on the availability of the first instance of the cloud-based application at the first cloud platform landscape, the modifying includes updating, in response to the first instance of the cloud-based application being unavailable and disaster recovery mode being enabled for the cloud-based application, a first record at the first traffic management device to map a custom domain of the cloud-based application to a first uniform resource locator of the second instance of the cloud-based application at the second cloud platform landscape;
validating, within a threshold quantity of time, a synchronicity within the traffic management pool based at least in part on the modification to the configuration of the first traffic management device being propagated to the second traffic management device, such that the second traffic management device is also configured to route the requests for the cloud-based application based on the availability of the first instance of the cloud-based application, the synchronicity within the traffic management pool being validated based at least on a second record at the second traffic management device also being updated, in response to the first instance of the cloud-based application being unavailable and disaster recovery mode being enabled for the cloud-based application, to map the custom domain of the cloud-based application to the first uniform resource locator of the second instance of the cloud-based application at the second cloud platform landscape; and
in response to the disaster recovery mode not being enabled for the cloud-based application, the requests for the cloud-based application by-pass the traffic management pool and are routed directly from a client device to the cloud-based application.

9. The method of claim 8, further comprising:
deleting the traffic management pool by at least modifying the configuration of the first traffic management device to cease routing the requests for the cloud-based application based at least on the unavailability of the first instance of the cloud-based application; and
validating the synchronicity within the traffic management pool further based on the modification to the configuration of the first traffic management device being propagated to the second traffic management device such that the second traffic management device is also configured to cease routing the requests for the cloud-based application based at least on the unavailability of the first instance of the cloud-based application.

10. The method of claim 8, wherein the first traffic management device and/or the second traffic management device are configured to route, to the first instance of the cloud-based application at the first cloud platform landscape, the requests for the cloud-based application based at least on the first instance of the cloud-based application being available.

11. The method of claim 9, wherein the modifying further includes updating, in response to the first instance of the cloud-based application being available, the first record at the first traffic management device and the second record at the second traffic management device to map the custom domain of the cloud-based application to a second uniform resource locator (URL) of the first instance of the cloud-based application.

12. The method of claim 11, wherein the first traffic management device and/or the second traffic management device are configured to route, to the second instance of the cloud-based application at the second cloud platform landscape, the requests for the cloud-based application based at least on the first instance of the cloud-based application being unavailable.

13. A non-transitory computer readable medium storing instructions, which when executed by at least one data processor, result in operations comprising:
in response to a disaster recovery mode being enabled for a cloud-based application, routing, by a traffic management pool and based on an availability of a first instance of the cloud-based application at a first cloud platform landscape, requests for the cloud-based application to the first instance of the cloud-based application at the first cloud platform landscape and routing, by the traffic management pool and based on the first instance of the cloud-based application being unavailable at the first cloud platform landscape, the requests for the cloud-based application to a second instance of the cloud-based application at a second cloud platform;
forming the traffic management pool that includes a first traffic management device and a second traffic management device, the traffic management pool being formed at least in part by modifying a configuration of the first traffic management device to route the requests for the cloud-based application based on the availability of the first instance of the cloud-based application at the first cloud platform landscape, the modifying includes updating, in response to the first instance of the cloud-based application being unavailable and disaster recovery mode being enabled for the cloud-based application, a first record at the first traffic management device to map a custom domain of the cloud-based application to a first uniform resource locator of the second instance of the cloud-based application at the second cloud platform landscape;
validating, within a threshold quantity of time, a synchronicity within the traffic management pool based at least in part on the modification to the configuration of the first traffic management device being propagated to the second traffic management device, such that the second traffic management device is also configured to route the requests for the cloud-based application based on the availability of the first instance of the cloud-based application, the synchronicity within the traffic management pool being validated based at least on a second record at the second traffic management device also being updated, in response to the first instance of the cloud-based application being unavailable and disaster recovery mode being enabled for the cloud-based application, to map the custom domain of the cloud-based application to the first uniform resource locator of the second instance of the cloud-based application at the second cloud platform landscape; and in response to the disaster recovery mode not being enabled for the cloud-based application, the requests for the cloud-based application by-pass the traffic management pool and are routed directly from a client device to the cloud-based application.

14. The computer-readable medium of claim 13, further comprising:

deleting the traffic management pool by at least modifying the configuration of the first traffic management device to cease routing the requests for the cloud-based application based at least on the unavailability of the first instance of the cloud-based application; and validating the synchronicity within the traffic management pool further based on the modification to the configuration of the first traffic management device being propagated to the second traffic management device such that the second traffic management device is also configured to cease routing the requests for the cloud-based application based at least on the unavailability of the first instance of the cloud-based application.

15. The computer-readable medium of claim 13, wherein the first traffic management device and/or the second traffic management device are configured to route, to the first instance of the cloud-based application at the first cloud platform landscape, the requests for the cloud-based application based at least on the first instance of the cloud-based application being available.

16. The computer-readable medium of claim 15, wherein the modifying further includes updating, in response to the first instance of the cloud-based application being available, the first record at the first traffic management device and the second record at the second traffic management device to map the custom domain of the cloud-based application to the uniform resource locator (URL) of the first instance of the cloud-based application.

17. The computer-readable medium of claim 16, wherein the first traffic management device and/or the second traffic management device are configured to route, to the second instance of the cloud-based application at the second cloud platform landscape, the requests for the cloud-based application based at least on the first instance of the cloud-based application being unavailable.

* * * * *